(12) United States Patent
Smith et al.

(10) Patent No.: US 10,257,673 B1
(45) Date of Patent: Apr. 9, 2019

(54) MESSAGING SYSTEM USING ENTERPRISE NUMBERS

(71) Applicant: SAP SE, Walldorf (DE)

(72) Inventors: Michael Smith, Ballston Spa, NY (US); Steven Garcia, South Riding, VA (US); Vaibhav Vohra, San Ramon, CA (US); Rohit Tripathi, San Ramon, CA (US); Fernando Nakano, Reston, VA (US); Luis Martinez, Mexico City (MX); Bhomik Pande, Bengaluru (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/144,050

(22) Filed: Sep. 27, 2018

(51) Int. Cl.
| | |
|---|---|
| *H04W 4/00* | (2018.01) |
| *H04W 4/14* | (2009.01) |
| *H04L 12/58* | (2006.01) |
| *H04W 8/28* | (2009.01) |
| *H04M 3/22* | (2006.01) |
| *H04M 3/42* | (2006.01) |

(52) U.S. Cl.
CPC ............ *H04W 4/14* (2013.01); *H04L 51/043* (2013.01); *H04L 51/046* (2013.01); *H04M 3/229* (2013.01); *H04M 3/42382* (2013.01); *H04W 8/28* (2013.01)

(58) Field of Classification Search
CPC .......... H04W 4/14; H04W 8/28; H04L 51/043
USPC ....... 455/466, 414.1, 415, 418, 422.1, 412.1
See application file for complete search history.

(56) References Cited

U.S. PATENT DOCUMENTS

| | | | | |
|---|---|---|---|---|
| 6,731,926 | B1* | 5/2004 | Link, II | H04M 3/537 379/67.1 |
| 7,849,135 | B2* | 12/2010 | Agrawal | G06Q 10/10 455/457 |
| 8,190,141 | B2* | 5/2012 | Krause | G06Q 99/00 455/411 |
| 2008/0102864 | A1* | 5/2008 | Donoghue | H04W 4/14 455/466 |

\* cited by examiner

*Primary Examiner* — Nghi H Ly
(74) *Attorney, Agent, or Firm* — Sterne, Kessler, Goldstein & Fox P.L.L.C.

(57) ABSTRACT

Disclosed herein are system, method, and computer program product embodiments for delivering messages using enterprise numbers. In an embodiment, a messaging system may facilitate two-way communication between enterprises and end user devices through the user of shared enterprise numbers. Multiple content providers and/or service providers may use the shared enterprise numbers to reach a wide range of end user devices. The end user devices may be, for example, telephones capable of communicating via short message service (SMS). The messaging system may assign enterprise numbers based on sessions to avoid conflicts when receiving reply messages. In an embodiment, the messaging system may assign enterprise numbers so received replies may be returned to corresponding enterprises without relying on keywords to be present in the reply message.

20 Claims, 7 Drawing Sheets

MESSAGING SYSTEM USING ENTERPRISE NUMBERS

BACKGROUND

As the world continues to develop, users continue to rely on mobile computing solutions and connectivity. Wireless communications allow users to connect and deliver messages. An example of messaging may be mass communications initiated from users or entities. These mass communications may include many recipients ranging from hundreds to millions. In some instances, these mass communications may take the form of mobile messages sent to end user devices. These messages may be sent using a short message service (SMS) or multimedia messaging service (MMS) and may utilize short codes or long codes. Enterprise companies may send mass messages to end users for various purposes. Systems facilitating communications between end-users and enterprise companies, however, face difficulties facilitating two-way communications. For example, messaging systems currently require users to include keywords in sent messages to facilitate communications. The addition of these keywords is burdensome for the end user and may create inefficiency in facilitating two-way messaging.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1A:
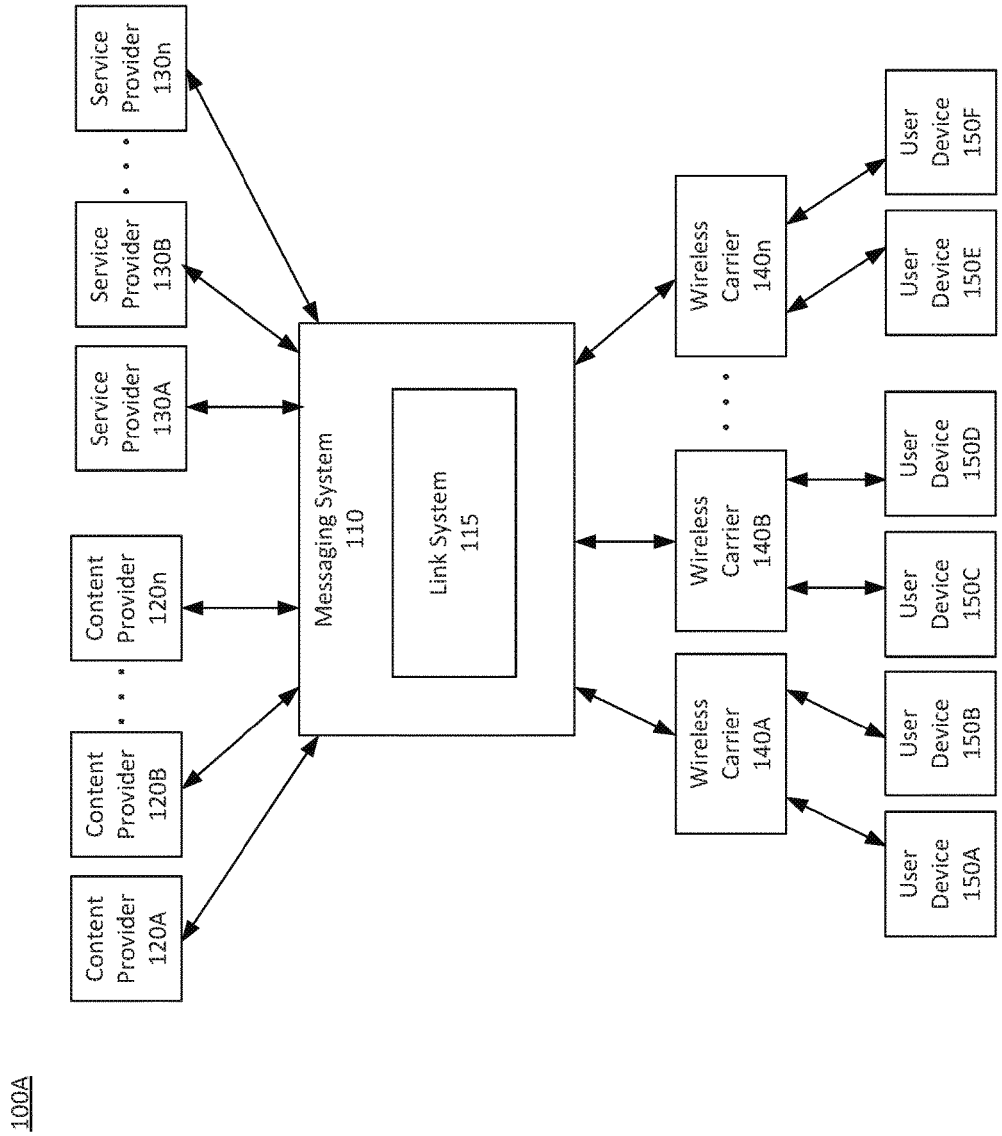
FIG. 1A depicts a block diagram of a messaging environment, according to some embodiments.

Provided herein are system, apparatus, device, method and/or computer program product embodiments, and/or combinations and sub-combinations thereof, for routing messages via enterprise numbers.

In an embodiment, a messaging system may facilitate communications between enterprises and end user devices. An enterprise may be a content provider and/or a service provider. For example, an enterprise may be a company and/or one or more users attempting to distribute messages to end user devices. In some embodiments, these messages may be in the form of mass communication(s) and/or public announcement(s) to many end user devices. Using the messaging system, an enterprise may deliver a message to many different end user devices. For example, an enterprise may use the messaging system to deliver marketing materials to end user devices. The end users may reply to the received messages to, for example, subscribe to a service and/or to obtain additional information and/or content. The messaging system may maintain session information to facilitate two-way communications between the enterprise and the end user devices.

In an embodiment, the messaging system may utilize a pool of enterprise numbers to facilitate communications. Various enterprises may share the enterprise numbers in the pool based on assignment by the messaging system. Enterprise numbers may be short message service (SMS) or multimedia messaging service (MMS) numbers and/or may utilize short codes and/or long codes. The enterprise numbers may be telephone numbers, Mobile Station International Subscriber Directory Numbers (MSISDNs), and/or International Mobile Subscriber Identity (IMSIs). In some embodiments, the messaging system may use a combination of these numbers.

By using a pool of enterprise numbers, the messaging system may coordinate the sharing of the enterprise numbers among the enterprises. Sharing enterprise numbers may allow the messaging system to avoid using a wasteful amount of enterprise numbers and/or more allow for an efficient usage of enterprise numbers. In an embodiment, the messaging system may monitor the enterprise number usage so that the messaging system may avoid the scenario with idle or unused enterprise numbers in the pool. As will be discussed below, the messaging system may manage the enterprise numbers to allocate and de-allocate the enterprise numbers to facilitate two-way communications between enterprises and user devices.

To facilitate two-way communications, the messaging system may assign an enterprise number to a unique "enterprise to user device" pair. In this manner, the messaging system may assign two enterprises to a single enterprise number to communicate to two different user devices. Allowing two enterprises to use a single enterprise number may reduce inefficiency and may avoid the situation where enterprise numbers are unused and may remain idle. To facilitate two-way communications, however, the messaging system may track data pairing an enterprise to a user device via an enterprise number. In an embodiment, to manage unique correspondence and/or to track return messages received by a user device, the messaging system may maintain data based on a unique identifier corresponding to the user device. For example, the unique identifier may be a telephone number, an MSISDN, an IMSI, and/or other identification information stored on a subscriber identification module (SIM) card.

By correlating an enterprise to a user device via an enterprise number, the messaging system may track user device responses and/or messages without relying on a keyword. This message communication reduces the burden on an end user to reply using a keyword.

Further, tracking based on enterprise number may allow the messaging system to scale geographically to different world regions. Enterprises may utilize the messaging system to manage enterprise numbers in different geographic locations. For example, the messaging system may manage short code and long code numbers. In this manner, enterprises may use the messaging system to deliver messages to user devices in a quick and efficient manner. In an embodiment, the enterprise may access the messaging system via the Internet or via a web application. For example, the messaging system may utilize an application programming interface (API) to allow enterprises to formulate and/or send communications to user devices. The messaging system may act as a communication platform as a service. In an embodiment, the messaging system may integrate with a cloud computing service for enterprise usage. Based on this configuration, the messaging system may act as an intermediary system that may convert data structures from a computing and/or cloud computing format to a mobile messaging format. Similarly, the messaging system may translate received mobile messages into a cloud computing format for delivery to an enterprise via the enterprise number data correlation.

The messaging system may be configured to optimize the number of enterprise numbers in the pool of enterprise numbers so that the number of idle or unused enterprise numbers is reduced. Additionally, smaller enterprises that may not be able to develop their own communication systems may participate with larger enterprises using the messaging system via the shared pool of enterprise numbers. In this case, the messaging system may support enterprises of different sizes.

The messaging system may also monitor and/or provide metrics related to messages sent by enterprises and/or messages received from user devices. In an embodiment, the messaging system may track metadata related to traffic to identify anomalies in the traffic. For example, the messaging system may track the origin of a message from the enterprise side or the user device side, the target of the message, the time between messages, the size of the messages, the time taken for response, and/or the number of messages. Using this information along with machine learning algorithms, the messaging system may detect outlier surges of traffic. This traffic may indicate the existence of potentially fraudulent behavior, such as, for example, credit card fraud from a untrustworthy enterprise. Similarly, the messaging system may identify spam messaging based on monitoring of the enterprise messages. The messaging system may identify bad faith and/or spam enterprises. Because the message system may facilitate communications for various enterprises as customers, the message system may detect and/or prevent the misuse of designated communication channels and/or security breaches.

In an embodiment, the messaging system may monitor statistics related to user device responses. For example, the messaging system may detect user responsiveness based on keywords used in messages sent from enterprises. For example, the messaging system may provide recommendations based on the detection of a response rate. The message system may track other response metrics related to message length, content, channel used to deliver the message, and/or follow-up time. In this manner, using machine learning algorithms and/or other artificial intelligence, the message system may identify patterns related to response rate and deliver this information to enterprises. The enterprises may then draft messages and/or use particular patterns of communication to increase end user response rate.

The messaging system may manage user subscriptions to content and/or services provided by an enterprise. For example, by monitoring user device response messages, the messaging system may track opt-in and/or opt-out information. Using this information, the messaging system may direct messages from an enterprise to users who have opted-in to communications and/or prevent messages from users who have opted-out of receiving messages.

Based on the facilitation of two-way communications between enterprises and end users as well as the monitoring of user metrics, the messaging system may support enterprises and provide wide-ranging messaging capabilities. The messaging system may operate to optimize the number of enterprise numbers shared among enterprises. In this manner, the messaging system may manage the load of messages to efficiently deliver messages in two-way communications.

These and other features of example embodiments will now be discussed in greater detail with respect to the corresponding figures.

FIG. 1A depicts a block diagram of messaging environment 100A, according to some embodiments. Messaging environment 100A my include messaging system 110. Messaging system 110 may include link system 115. Messaging system 110 may facilitate two-way communications between content providers 120 and/or service providers 130 to user devices 150.

Content providers 120 and service providers 130 may collectively be referred to as enterprises. In an embodiment, enterprises may be a company, entity, and/or one or more user attempting to distribute messages to end user devices. For example, a service provider 130 may be an Internet and/or online service provider, a merchant, a financial institution, a postage institution, a service bureau, and/or other entities providing services to end users. Content providers 120 may include entities providing content such as files, information, and/or goods to a user. For example, a content provider may be a news organization, an advertising agency, and/or a brand. In an embodiment, enterprises may be entities wishing to market goods or services to a user. In this manner, enterprises may utilize messaging system 110 to deliver messages to user devices 150. These messages may be repeated messages, and in some embodiments, the messages may be mass communications to many user devices 150. In an embodiment, the messages may include advertising material content and/or services provided by content providers 120 and/or service providers 130.

Content providers 120 and service providers 130 may access and/or use messaging system 110 via an application software interface. In an embodiment, the application software interface may be an API. Enterprises may use a combination of hardware and/or software to send messages to messaging system 110 for delivery to user devices 150. Enterprises may also specify user devices 150 to receive the messages by providing user device identification information. User device identification information may be, for example, a telephone number. To deliver this information, enterprises may access an API provided by messaging system 110. In an embodiment, messaging system 110 may provide a graphical user interface accessible by the enterprises to manipulate messages. In an embodiment, enterprises may deliver commands to messaging system 110. Enterprises may access messaging system 110 via a web browser and/or the Internet.

Messaging system 110 may be instantiated on a cloud computing platform accessible to an enterprise. In an embodiment, messaging system 110 may be a Communications Platform as a Service (CPaaS). Messaging system 110 may include one or more processors, memory, databases, servers, routers, modems, and/or antennae configured to facilitate two-way communications between enterprises and user devices. The messages may be originated by an enterprise and may terminate at a user device 150. Messages may originate at a user device 150 and terminate at an enterprise. In an embodiment, messages originating at a user device 150 may be a reply message to a message sent by an enterprise. To facilitate two-way communications, messaging system 110 may include subsystems configured to process messages and route the messages to the intended recipients. The discussion herein with respect to FIG. 2 describes an embodiment of subsystems within messaging system 110.

One subsystem within messaging system 110 may be link system 115. An embodiment of link system 115 is described with respect to FIG. 2. Link system 115 may provide administrator controls for messaging system 110. For example, link system 115 may receive administrator commands related to code management and/or the management of enterprise numbers. Link system 115 may also control message queuing and/or scheduling. In an embodiment, link system 115 may monitor exchanged messages and/or compile statistics related to the messages.

In an embodiment, a message may be an SMS message, a MMS message, an IMS message, an E-Mail message, a VoIP data stream, a video data stream (e.g., a movie, a video conference call, a voice telephone call, signaling data, command-and-control data, an audio data stream (e.g., a song), instant messaging data, images, game data, data from software applications, IP data, SS7 data, and/or other types of data). Messaging system 110 may convert data into different formats or data structures to support various communication protocols. In an embodiment, messaging system 110 may include a thunking layer that may support different access types, protocols, data, adaptations, and/or equalizations to facilitate message distribution. The thunking layer may aid in converting data formatting. For example, messaging system 110 may convert messages using a Short Message Peer-to-Peer (SMPP) protocol to a Representational State Transfer (REST) or a RESTful web service structure. In this manner, messaging system 110 may act as a communication and/or conversion hub between enterprises and user devices 150.

In an embodiment, to deliver a message to a user device 150, messaging system 110 may communicate with a wireless carrier 140. A wireless carrier 140 may be, for example, a combination of one or more of a mobile operator, a landline provider, a Wi-Fi service provider. A user device 150 may be one or more of a mobile telephone (such as, for example, a feature phone or a smart phone), a handheld computer, a wearable device (such as, for example, a smart watch), an Internet-enabled phone, a pager, a radio, a television, an audio device, a car audio system, a recorder, a text-to-speech device, a bar-code scanner, a net appliance, a mini-browser, a personal data assistant (PDA), a sensor, and/or a component of a computing system. In an embodiment, a user device 150 may be a computing device configured to receive a message and/or transmit a message to messaging system 110. User device 150 may be configured to communicate with messaging system 110 via wireless carrier 140.

Wireless carrier 140 may deliver messages from messaging system 110 after messaging system 110 has routed the message. Wireless carrier 140 may also facilitate the transfer of messages from user devices 150 to messaging system 110. In an embodiment, wireless carrier 140 may communicate with a user device 150 based on the enterprise number assigned by messaging system 110. For example, an enterprise number may represent messaging system 110 as depicted on user device 150. In an embodiment, the enterprise number may be a phone number. Messaging system 110 may deliver a message using the phone number. When a user device 150 responds or replies to the message, user device 150 may respond to the phone number.

Figure 1B:
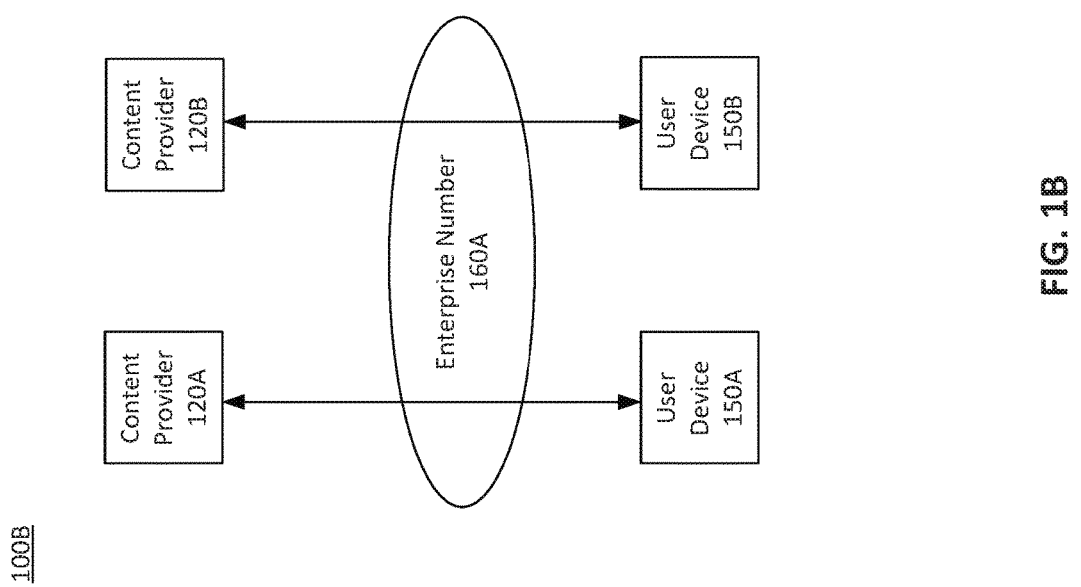
FIG. 1B depicts a block diagram of a communication pathway using a single enterprise number, according to some embodiments.

FIG. 1B depicts a block diagram of a communication pathway 100B using a single enterprise number 160A, according to some embodiments. Messaging system 110 may designate communication pathway 100B when managing enterprise numbers. Enterprise number 160A may be shared between two content providers 120A and 120B. Content providers 120 may be interchanged with service providers 130 and/or a combination of enterprises. Messaging system 110 may route messages from content provider 120A to user device 150A and messages from content provider 120B to user device 150B. In this manner, messaging system 110 may facilitate sharing of an enterprise number 160A.

In an embodiment, messaging system 110 may store data pairing content provider 120A to user device 150A via the enterprise number 160A. For example, messaging system 110 may log an active communication as a session. Content provider 120A may initiate a message to messaging system 110 to send a message to user device 150A. Content provider 120A may use a cloud computing platform and may supply the message to messaging system 110 as well as a user device identification for user device 150A. For example, content provider 120A may provide a telephone number associated with user device 150A.

Figure 3:
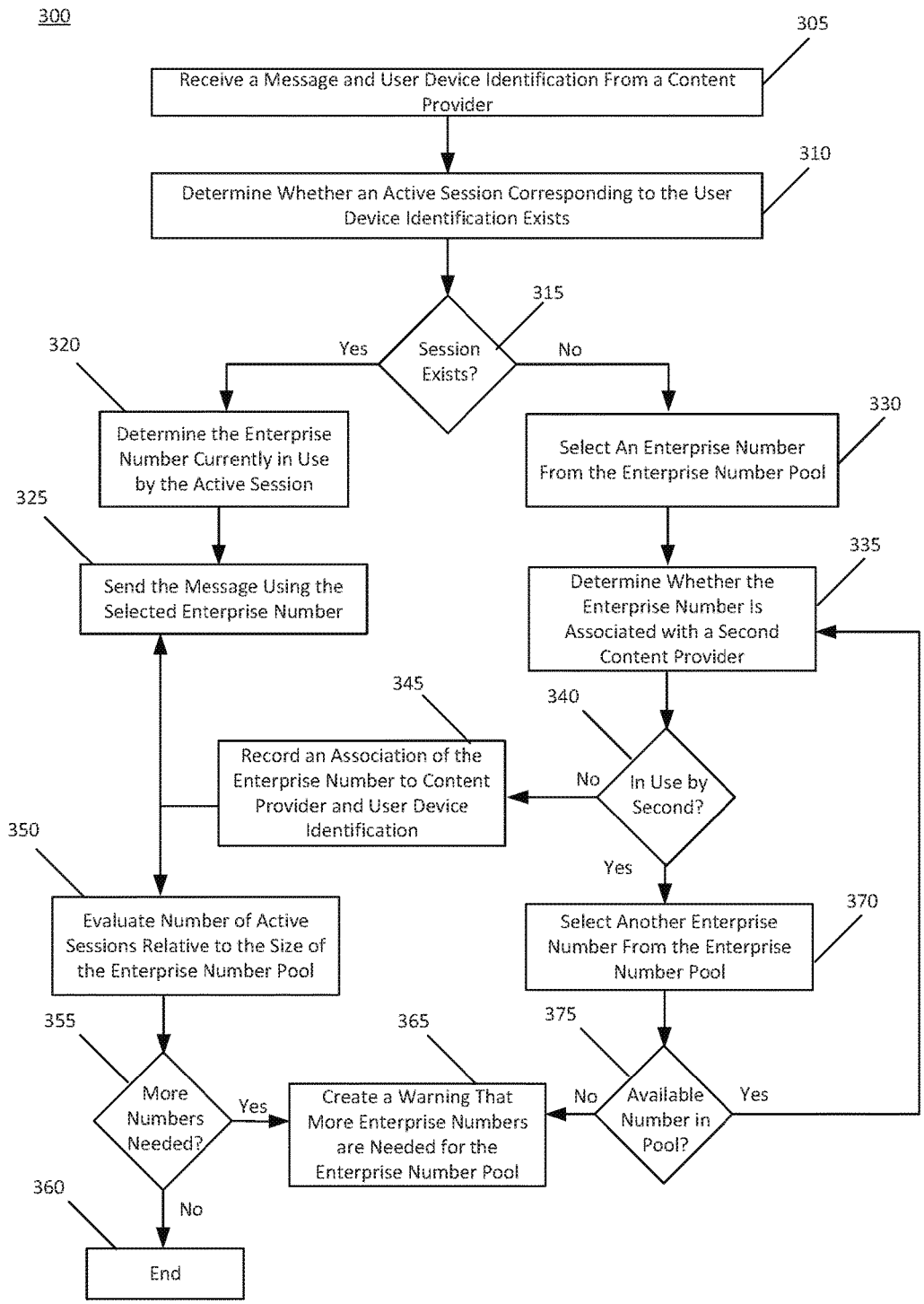
FIG. 3 depicts a flowchart illustrating a method for sending a message using an enterprise number, according to some embodiments.

Messaging system 110 may then assign enterprise number 160A to the message. In an embodiment, enterprise number 160A may be an unused number. In an embodiment, content provider 120B may be using enterprise number 160A to send a message to user device 150B. Messaging system 110 may facilitate communication using enterprise number 160A. In this manner, messaging system 110 may transmit the message from content provider 120A to user device 150A even if messaging system 110 has assigned enterprise number 160A to the communication between content provider 120B and user device 150B. Messaging system 110 may store and/or update a data record indicating that both user device 150A and user device 150B have simultaneous active sessions via enterprise number 160A. FIG. 3 provides an embodiment of a message delivery method that may be used by messaging system 110.

After determining that enterprise number 160A may be used to transmit the message from content provider 120A to user device 150A, messaging system 110 may transmit the message to a wireless carrier 140A. Wireless carrier 140A may then deliver the message to user device 150A. In an embodiment, wireless carrier 140A may indicate that the particular enterprise number 160A is being used. For example, a user using user device 150A to view the enterprise number 160A. The enterprise number 160A may be a phone number or an MSISDN, for example.

After receiving the message, a user using user device 150A may decide to reply to the message and may wish to send a message back to content provider 120A. For example, the message may be a mass communication and/or may prompt an end-user to reply to the message to receive information or to subscribe to a service. The message may state "Reply with 'Yes' to become a member." In this manner, the user may wish to reply with a text message saying "Yes." While this provides an example of subscribing, messaging system 110 may be used by enterprises to deliver many other types of messages that may receive responses.

In some systems, user devices 150 may be required to reply using a keyword in a message so that the message routing systems are able to correlate received messages with corresponding content providers 120A. For example, message routing systems may request that user device 150A reply using the keyword "PIZZA" and store an association of "PIZZA" with Company A. In this manner, message routing systems could distinguish messages intended for content provider 120A rather than content provider 120B based on the keywords included in the message.

In contrast, messaging system 110 may avoid the cumbersome addition of keywords to messages by associating content provider 120A to user device 150A via the enterprise number 160A. Messaging system 110 may designate this information as a session so that when messaging system 110 receives a message from user device 150A via enterprise number 160A, messaging system 110 may correlate the received message with content provider 120A. Similarly, if user device 150B transmits a message to messaging system 110 as a reply to enterprise number 160A, messaging system 110 may correlate the received message with content provider 120B even if both content providers 120A and 120B use the same enterprise number 160A. By storing data uniquely identifying the pairs, messaging system 110 may maintain session information using enterprise number 160A. Messaging system 110 may allow for the shared simultaneous usage of enterprise number 160A. This configuration may reduce the pool of used enterprise numbers and/or may allow messaging system 110 to reduce system resource expenditure when routing messages.

When messaging system 110 receives a reply message from user device 150A, messaging system may correlate the user device identification included in the message indicating the source of the message (i.e., user device 150A) with the enterprise number 160A used to deliver the message from user device 150A to messaging system 110. Messaging system 110 may then access stored association data to determine the recipient of the reply message as being content provider 120A. Messaging system 110 may then deliver the reply message to content provider 120A. An example embodiment of this reply message processing is further discussed with reference to FIG. 4.

Messaging system 110 may also monitor and/or provide metrics related to messages sent by content provider 120A and/or messages received from user device 150A. In an embodiment, messaging system 110 may track metadata related to message traffic to identify anomalies in the traffic. For example, messaging system 110 may track the origin of a message, the target of the message, the time between messages, the size of the messages, the time taken for response, and/or the number of messages. Using this information along with machine learning algorithms, messaging system 110 may detect outlier surges of traffic. Messaging system 110 may utilize neural networks to learn patterns based on these traffic parameters. Outlier traffic may indicate the existence of potentially fraudulent behavior, such as, for example, credit card fraud from an untrustworthy enterprise. Similarly, messaging system 110 may identify spam messaging based on monitoring of the enterprise messages. Messaging system 110 may identify bad faith and/or spam enterprises. Because message system 110 may facilitate communications for various enterprises as customers, message system 110 may detect and/or prevent the misuse of designated communication channels and/or security breaches.

In an embodiment, messaging system 110 may monitor statistics related to user device 150 responses. For example, messaging system 110 may detect user responsiveness based on keywords used in messages sent from enterprises. Messaging system 110 may provide recommendations based on the detection of a response rate. Message system 110 may track other response metrics related to message length, content, channel used to deliver the message, and/or follow-up time. In this manner, using machine learning algorithms and/or other artificial intelligence, message system 110 may identify patterns related to response rate and deliver this information to enterprises. The enterprises may then draft messages and/or use particular patterns of communication to increase end user response rate.

In an embodiment, messaging system 110 may manage user subscriptions to content and/or services provided by an enterprise. For example, by monitoring user device 150 response messages, messaging system 110 may track opt-in and/or opt-out information. Using this information, messaging system 110 may direct messages from an enterprise to users who have opted-in to communications and/or prevent messages from users who have opted-out of receiving messages.

Figure 1C:
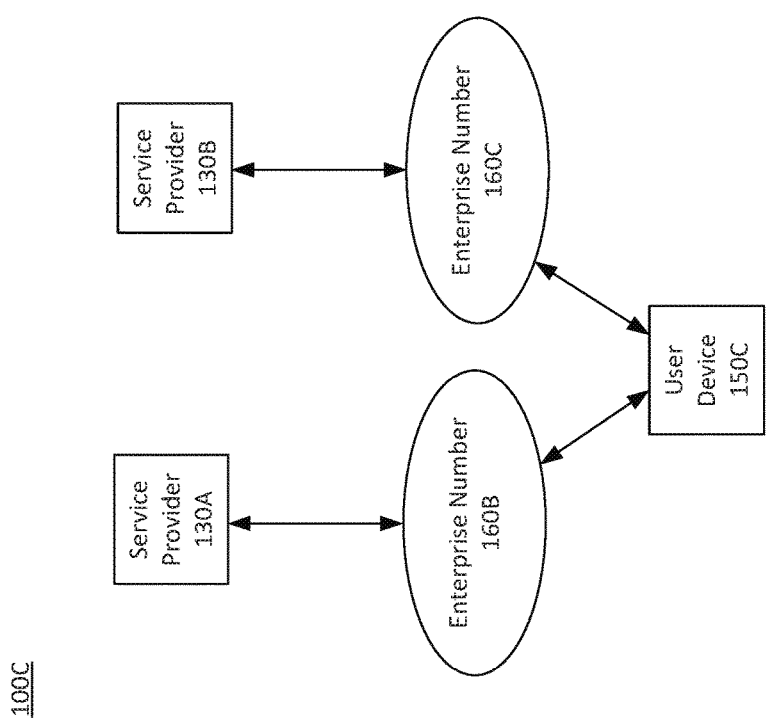
FIG. 1C depicts a block diagram of a communication pathway using two enterprise numbers, according to some embodiments.

FIG. 1C depicts a block diagram of a communication pathway 100C using two enterprise numbers 160B and 160C, according to some embodiments. While FIG. 1C shows two enterprise numbers 160B and 160C for example purposes, this disclosure is directed to any number of enterprise numbers 160 and service providers 130. In an embodiment, messaging system 110 may facilitate two-way communication between service providers 130A and 130B and user device 150C. Service providers 130 may be interchanged with content providers 120 and/or a combination of enterprises.

In an embodiment, both service providers 130 may send messages to user device 150C. In this case, messaging system 110 may utilize two enterprise numbers 160B and 160C to coordinate the delivery of messages from service providers 130 as well as coordinate the delivery of reply messages from user device 150C. In this situation, messaging system 110 may still avoid the use of keywords to deliver reply messages.

To illustrate an example embodiment, service provider 130A may initiate a message to be delivered to user device 150C. Service provider 130A may transmit the message to messaging system 110 and may include a user device identification indicating that the message should be delivered to user device 150C. After receiving the message, messaging system 110 may detect that service provider 130B is currently maintaining an active session with user device 150C. For example, service provider 130B may have initiated a message to user device 150C, and messaging system 110 may have assigned enterprise number 160C to facilitate the transfer of the message. Messaging system 110 may have assigned enterprise number 160C for an amount of time to indicate the presence of an active session for waiting for a reply from user device 150C to service provider 130B.

When service provider 130A attempts to send a message to user device 150C, messaging system 110 may recognize the presence of an active session based on a check of internally stored records associating active sessions with enterprise numbers. After recognizing that the enterprise number 160C may be in use by another service provider 130B, messaging system 110 may select enterprise number 160B from the pool of enterprise numbers. In an embodiment, the pool of enterprise numbers may be a list of enterprise numbers. Messaging system 110 may follow a sequence from a list or table to select the next available enterprise number. After selecting enterprise number 160B, messaging system 110 may deliver the message to user device 150C using enterprise number 160B.

In an embodiment, messaging system 110 may use this configuration when multiple enterprises attempt to message the same user device 150. Using multiple enterprise numbers allows messaging system 110 to correlate return or reply messages with the corresponding enterprises initiating the first message. For example, after receiving the message from enterprise number 160B, user device 150C may have received at least two total messages: one from enterprise number 160B and one from enterprise number 160C. Replying to either of these enterprise numbers 160B or 160C may result in messaging system 110 receiving both reply messages. Depending on the enterprise number 160B or 160C used, however, messaging system 110 may correlate the reply message to the correct service provider 130. In this manner, a user may still avoid using keywords while messaging system 110 may coordinate messaging based on the stored information tracking the unique service provider 130 to user device 150 pairing via the corresponding enterprise number.

In an embodiment, messaging system 110 may assign enterprise number 160B to service provider 130A because an active session is present regarding enterprise number 160C. If this session were to terminate before messaging system 110 were to receive the message from service provider 130A, messaging system 110 could assign enterprise number 160C to be used by service provider 130A. In this scenario, messaging system 110 could deallocate and/or remove the association of service provider 130B to enterprise number 160C. Based on the termination of sessions, messaging system 110 may reduce the number of enterprise numbers available in the pool of enterprise numbers. In this manner, messaging system 110 may reduce the number of idle or unused enterprise numbers.

In an embodiment, if messaging system 110 detects an increase in message traffic, messaging system 110 may increase the number of enterprise numbers in the pool. For example, if enterprise number 160B is a phone number, messaging system 110 may request and/or purchase enterprise number 160B from an communication authority to increase the pool. For example, messaging system 110 may generate an automatic request to increase the pool. In an embodiment, messaging system 110 may generate a notification to an administrator of messaging system 110 to notify and/or recommend that the number of enterprise number be increased.

Based on the communication pathways 100B and 100C described with reference to FIGS. 1B and 1C, messaging system 110 may route messages and coordinate messaging using an enterprise number approach. Storing correlation data further may allow messaging system to direct reply messages to the correct enterprise while still allowing enterprises to share enterprise numbers in some instances.

Figure 2:
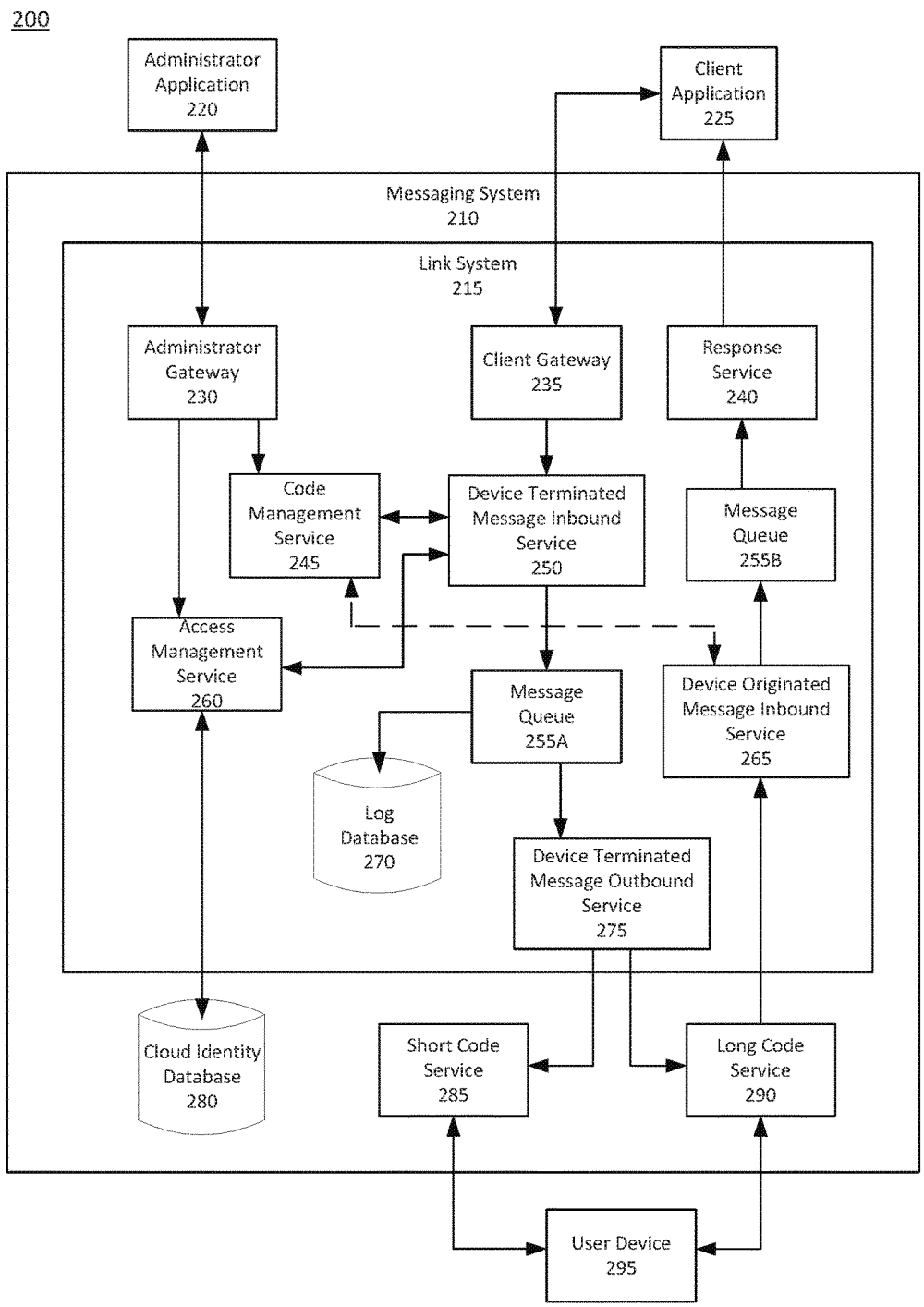
FIG. 2 depicts a block diagram of messaging system components within a messaging environment, according to some embodiments.

FIG. 2 depicts a block diagram of messaging system 210 having components within a messaging environment 200, according to some embodiments. Messaging environment 200 may include messaging system 210, administrator application 220, client application 225, and/or user device 295. Messaging system 210 may be similar to messaging system 110 as described with reference to FIG. 1A, FIG. 1B, and FIG. 1C. User device 295 may be similar to user device 150 as described with reference to FIG. 1A, FIG. 1B, and FIG. 1C.

Messaging environment 200 may depict the interaction of components of messaging system 210 with administrator application 220, client application 225, and/or user device 295. Administrator application 220 may be any combination of hardware and/or software configured to manage the transmission and receipt of messages by messaging system 210, Administrator application 220 may monitor and/or route messages to and from user device 295. In an embodiment, administrator application 220 may be an Internet browser and/or an application configured to communication with messaging system 210. Administrator application 220 may communication with administrator gateway 230. Administrator gateway 230 may be a software interface such as an API. Administrator gateway 230 may provide graphical user interface instantiation data to administrator application 220 so that an administrator may view and/or manipulate configurations of messaging system 210.

Using administrator application 220, an administrator of messaging system 210 may manage the pool of enterprise numbers used to deliver messages. The management of enterprise numbers may be manipulated using code management service 245. In an embodiment, before being granted permission to manipulate or configure messaging system 210, an administrator may need to provide credentials related to a user account. The credentials may be, for example, a username and/or password. Access management service 260 may compare provided credentials with permission information stored in cloud identity database 280. Based on this comparison, access management service 260 may determine whether administrator application 220 is permitted to manipulate and/or configure parameters of messaging system 210. In an embodiment, messaging system 210 may be implemented using a cloud computing platform and an administrator may administrator the cloud computing functionality to an enterprise.

In an embodiment, enterprises may use client application 225 to access messaging system 210. Similar to administrator application 220, client application 225 may be a combination of hardware and/or software configured to send messages to messaging system 210 for delivery to user device 295. In an embodiment, client application 225 may be an Internet browser and/or an application configured to communication with messaging system 210. Client application 225 may communicate with client gateway 235. Client gateway 235 may be a software interface such as an API. Client gateway 235 may provide graphical user interface instantiation data to client application 225 so that an enterprise user may generate messages to user device 295 and/or supply user device identification data to allow messaging system 210 to identify user device 295.

When an enterprise sends a message, messaging system 210 may use link system 215 to perform the processing of the message. Link system 215 may refer to the processing of messages originating from the enterprise and/or user device 295. Link system 215 may provide administrator controls for messaging system 210. Link system 215 may also control message queuing and/or scheduling. In an embodiment, link system 215 may monitor exchanged messages and/or compile statistics related to the messages.

As described earlier, link system 215 may include administrator gateway 230 and client gateway 235. In an embodiment, when client application 225 sends a message to client gateway 235, link system 215 may execute device terminated message inbound service 250.

Device terminated message inbound service 20 may interact with code management service 245 and access management service 260. Access management service 260 may determine rights and/or permissions associated with client application 225. For example, access management service 260 may determine whether the client application 225 has been granted permission to use a certain set of enterprise numbers. Access management service 260 may track whether client application 225 has stayed within a threshold number of active sessions or used enterprise numbers.

An administrator may set permissions for client application 225. These permissions may be accessed via cloud identity database 280. In an embodiment, client gateway 235 may also access cloud identity database 280 when an enterprise user uses client application 225 to access or log-in to messaging system 210. Access management service 260 may also monitor message-related permissions such as quantity of messages, data used, number of active session, number of used enterprise numbers, frequency of sent messages generally, frequency of sent messages to a particular user device 295, and/or other metrics that may be controlled to limit usage by client application 225. Using this control, messaging system 210 may adjust the rights afforded to different enterprises using their own respective client applications 225 to send messages.

In an embodiment, device terminated message inbound service 250 may access code management service 245 to determine an enterprise number to apply to the particular message received from client application 225. Code management service 245 may maintain and/or manage the pool of enterprise codes. In an embodiment, when selecting an enterprise code, code management service 245 may execute method 300 as described with reference to FIG. 3. Code management service 245 may generate a communication pathway such as communication pathways 100B and 100C as described with reference to FIG. 1B and FIG. 1C.

In an embodiment, code management service 245 may select an enterprise number depending on the geographic location of the user device 295. For example, code management service 245 may prioritize short code enterprise numbers to deliver a high volume of communications. Code management service 245, however, may detect that certain geographic areas may not be serviced by short codes. In this case, code management service 245 may use a long code enterprise number. Code management service 245 may also select a long code enterprise number as an overflow selection if, for example, all of the short code enterprise numbers are currently unavailable due to use. Similarly, the selection and assignment of enterprise numbers may aid in the delivery of the message as well as provide a set-up for detecting return messages and routing received reply messages to the appropriate enterprise.

After code management service 245 provides an enterprise number to device terminated message inbound service 250, device terminated message inbound service 250 may generate a record associating the enterprise number with the particular enterprise and user device 295. The record may be a data structure that includes an identification of the enterprise, the enterprise number, and user device identification data corresponding to user device 295. Code management service 245 may maintain this record and/or store this record in memory maintained by messaging system 210.

In addition to determining an enterprise number, device terminated message inbound service 250 may also perform monitoring on metrics related to messages send from client application 225. This monitoring may occur among many enterprises using various iterations of client application 225. Device terminated message inbound service 250 may collect statistics across different enterprises and analyze the statistics using machine learning, neural networks, and/or other artificial intelligence to detect patterns and anomalies in traffic.

For example, device terminated message inbound service 250 may perform time analyses for detecting spam and/or a security breach. Depending on a traffic profile of a message, device terminated message inbound service 250 may operate in conjunction with device originated message inbound service 265 to highlight anomalies in a traffic pattern.

After determining an enterprise number, device terminated message inbound service 250 may pass the message and/or routing information to message queue 255A. Message queue 255A may be a buffer and/or may regulate the rate of message transmission. For example, if the enterprise is sending mass communications using messaging system 210, message queue 255A may aid in scheduling the transmission of the messages after an enterprise number has been assigned.

In an embodiment, message queue 255A may use a database system such as log database 270 to store a copy of the message. Log database 270 may also store metadata related to message delivery, such as, for example, timestamps related to message delivery.

After potential buffering of the message at message queue 255A, the message may be delivered to device terminated message outbound service 275. Here, link system 215 may release the message to short code service 285 or long code service 290 to deliver the message to user device 295. The selection of short code service 285 or long code service 290 may depend on the type of enterprise number selected.

For example, if code management service 245 assigned a short code enterprise number, device terminated message outbound service 275 may direct the message to short code service 285. In an embodiment, short code service may utilize an application-to-person (A2P) configuration to deliver an SMS message to user device 295. Similarly, long code service 290 may use an A2P configuration and/or a person-to-person (P2P) messaging configuration.

In this embodiment, messaging system 210 may combine short code and long code SMS message delivery for multiple enterprises. This configuration allows for flexibility in message delivery and may allow for scalability throughout the world. In an embodiment, an enterprise may seek to deliver messages to disparate portions of the world. Messaging system 210 may be able to assign different enterprise numbers to accommodate this desire. For example, some instances of the message may be assign to a short code while some instances of the message may be assigned to a long code. In this case, messaging system 210 may direct and/or route the same message using different enterprise numbers as well as different enterprise number types. This flexibility may allow for messaging system 210 to act as a communication platform as a service that is scalable to reach a wide geographic area.

After user device 295 receives a message, user device 295 may reply to the message. In an embodiment, regardless of how the message was delivered to user device 295, the reply message may be sent to long code service 290. For example, if user device 295 received the message via short code service 285, user device 295 may reply using long code service 290. The long code response may represent the long code associated with user device 295. For example, the long code may be a phone number, such as a 10-digit phone number, associated with user device 295.

After long code service 290 receives the reply message, long code service 290 may transmit the reply message to device originated message inbound service 265. Device originated message inbound service 265 may perform various tasks such as determining the appropriate enterprise to receive the reply message and/or generate statistics related to the return message in conjunction with device terminated message inbound service 250.

For example, device originated messaging inbound service 265 may monitor response rates. In an embodiment, device originated messaging inbound service 265 may correlate responsiveness based on the content of the originally sent message. For example, device originated messaging inbound service 265 may correlate words of the message with whether or not user device 295 generated a reply message. Using this information along with machine learning algorithms, device originated messaging inbound service 265 may determine statistics related to response rate. For example, device originated messaging inbound service 265 may generate an example recommendation message such as, "Our stats suggest that with keyword XXXXX, response rate is higher by 30%."

In an embodiment, device originated messaging inbound service 265 may also monitor traffic profiles to detect spam and/or security breaches. The time taken for a "round trip" delivery of a message along with a reply may indicate the presence of spam or a delivery breach. For example, if the traffic profile of a message is an authentication-type message or a one-time pin message and the time taken to validate the pin is much less than the average time taken to validate the pin from an end-user perspective, device originated messaging inbound service 265 may detect a hacked situation. For example, a computer system may have requested the pin from an enterprise and used the pin faster than a human.

Similarly, if a traffic profile is used for marketing and/or advertising campaigns where messages are sent from client application 225 and/or reply messages are send from user device 265 at a high frequency, device originated messaging inbound service 265 may detect the presence of spam and/or an attempt to congest the system resources of messaging system 210.

Returning to the monitoring of parameters to measure response rate, device originated messaging inbound service 265 may detect responsiveness based on message size, words, and/or message length. For example, using machine learning and/or artificial intelligence to detect patterns among messages sent and responsiveness, messaging system 210 may produce an example recommendation message such as, "Keeping the message length YY characters, with words such as "AAA" "ZZZ" may lead to higher response by 15%."

Device originated messaging inbound service 265 may also provide a recommendation based on the messaging channel used to contact user device 295 and/or the sequencing of usage depending on measured geography and/or traffic profiles. For example, device originated messaging inbound service 265 may detect that "Engaging users first via a message in Application A in this geography followed by an SMS message may lead to better response by 12%."

Device originated messaging inbound service 265 may also provide a recommendation based on follow-up time. For example, client application 225 may provide instructions and/or set a schedule for messaging system 210 to deliver periodic messages to user device 295. Similarly, client application 225 may periodically send messages to messaging system 210 for delivery to user device 295. In this case, device originated messaging inbound service 265 may track responsiveness based on the follow-up time using machine learning algorithms to detect patterns in responsiveness. Device originated messaging inbound service 265 may generate a recommendation message such as "Follow-up performed after 2 days for this kind of engagement activity may lead to an increase in response by 18%."

Based on these examples, device originated messaging inbound service 265 may monitor metrics related to responsiveness based on message statistics compiled by device terminated message inbound service 250. In an embodiment, messaging system 210 may monitor responsiveness across multiple enterprises to compile larger amounts of data for analysis.

In addition to monitoring responsiveness, device originated messaging inbound service 265 may monitor subscription information, such as, for example, opting-in or opting-out of receiving messages from an enterprise. This opt-in or opt-out message may be a reply message generated from user device 295. For example, an enterprise may send a message to user device 295 asking that the user send a reply message if the user wishes to subscribe to more messages. If device originated messaging inbound service 265 receives a reply message, device originated messaging inbound service 265 may analyze the content of the reply message to determine whether the user has opted-in.

For example, if the user has replied in the affirmative, device originated messaging inbound service 265 may store a record in memory indicating that the user has opted-into receiving messages from a particular enterprise. When the enterprise sends future messages, messaging system 210 may route the future message to user device 295 automatically.

In an embodiment, the message may include a link and selecting the link may transmit an acknowledgment to messaging system 210 via the Internet. This link may indicate that the user has agreed to subscribe or opt-in. In an embodiment, the messages may include multiple links allowing users to share their location or device type. Sharing this information in a reply message or by selecting a link may provide enterprises and/or messaging system with 210 additional information to enhance mass communications to yield better responsiveness. The links may also allow for opting-out of sharing this information.

Similarly to opting-in, messaging system 210 may perform an opt-out service for enterprises. For example, an initial message to user device 295 may inform the user device 295 that it has been subscribed to a messaging list and presenting the option to opt-out. If user device 295 returns an opt-out message, device originated messaging inbound service 265 may analyze the content and add user device 295 to a list for opting-out or unsubscribing.

In an embodiment, the reply message to opt-out may include a keyword to opt-out. In an embodiment, the reply message may be the selection of a link contained in the initial message to user device 295. Similarly, in an embodiment, where messaging system 210 operates on a cloud computing platform, user devices 295 may opt-out using computing techniques such as sending an email with "unsubscribe" in the subject line and sending a direct message via a social media platform. In an embodiment, messaging system 210 may allow for voice channel calls to opt-out. For example, leaving a missed call at a designated telephone number may indicate an opt-out.

Because messaging system 210 may bridge many forms of communication, messaging system may manage subscription services for enterprises. Messaging system 210 may manage users who have opted-in or opted-out of receiving communications from enterprises. In this case, messaging system 210 may maintain an address book of user devices 295 so that enterprises need not maintain a separate list of subscribed individuals. This configuration allows client applications to remove the burden of supplying a full list of individuals to contact when desiring to send a message to subscribers.

In an embodiment, depending on the type of message, device originated messaging inbound service 265 may return the reply message to the corresponding client application 225 or enterprise that originated the original message. In this case, device originated messaging inbound service 265 may access code management service 245 to identify the originating enterprise. In an embodiment, code management service 245 may check the stored record associating user device 295 to an enterprise via the enterprise number used to reply. In this manner, device originated messaging inbound service 265 may decode the message without relying on the user to include a keyword in the reply message.

After determining the appropriate enterprise, device originated messaging inbound service 265 may transfer the message to message queue 255B. Similar to message queue 255A, message queue 255B may act as a buffer for delivering messages. For example, if messaging system 210 is delivering many messages to multiple enterprises, message queue 255B may aid in scheduling and/or coordinating the delivery of the message.

When messaging system 210 is ready to send the reply message to the enterprise, messaging system 210 may use response service 240. Response service 240 may follow enterprise configurations for receiving reply messages. For example, client application 225 may have elected to receive the reply message via the programming interface used to send the message. In this manner, response service 240 may deliver the reply message to client application 225. In an embodiment, the enterprise may elect to receive the reply message in another context. For example, the enterprise may receive the reply message in an email or another type of notification. Messaging system 210 may use these forms and/or may deliver the message in a cloud computing environment.

Based on this configuration, messaging system 210 may deliver messages on behalf of enterprise connecting to messaging system 210 via a client application 225. An administrator application 220 may configure messaging system and/or set parameters for message deliver or usage by enterprises. Messaging system 210 may use a pool of enterprise numbers that may be shared among enterprises to more efficiently reduce idle or unused enterprise numbers. Also, messaging system 210 may use different types of enterprise numbers such as short codes and/or long codes. In this manner, messaging system 210 may reach a wide range of user devices 295 and may offer scalability to many enterprises.

FIG. 3 depicts a flowchart illustrating a method 300 for sending a message using an enterprise number, according to some embodiments. Method 300 shall be described with reference to FIG. 1A; however, method 300 is not limited to that example embodiment.

In an embodiment, messaging system 110 may utilize method 300 to send a message using an enterprise number. The foregoing description will describe an embodiment of the execution of method 300 with respect to messaging system 110. While method 300 is described with reference to messaging system 110, method 300 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3, as will be understood by a person of ordinary skill in the art.

At 305, messaging system 110 may receive a message and a user device identification from a content provider 120. In terms of discussion for FIG. 3, content provider 120 may be interchangeable with service provider 130. In an embodiment, messaging system 110 may provide an API for content provider 120 to provide a message. In addition to providing the message, content provider 120 may provide a user device identification. This identification may specify the particular user device 150 to receive the message. The user device identification may be a telephone number associated with the user device 150. Content provider 120 may provide a message with many user device identifications to indicate that the message be delivered to many user devices 150.

At 310, messaging system 110 may determine whether an active session corresponding to the user device identification exists. In an embodiment, messaging system 110 may consult records of active sessions stored in memory. An active session may exist when messaging system 110 has recently sent a message to the user device 150 corresponding to the user device identification provided by content provider 120. Messaging system 110 may maintain a set amount of time to receive a reply message from the user device 150. In this manner, when a session is active, the enterprise number has been allocated such that another enterprise may not use the same enterprise number to communicate with the same user device 150. Using different enterprise numbers in this session scenario may allow messaging system 110 to distinguish between different enterprises. The time period for a session may expire when a reply message has been received and/or when a time period has elapsed.

At 315, if an active session exists, messaging system 110 may determine the enterprise number currently in use by the active session at 320. In an embodiment, messaging system 110 may check stored records associating enterprises with user devices 150 via enterprise numbers. At 325, after determining the enterprise number currently in use by the active session, messaging system 110 may send the message using the selected enterprise number. In an embodiment, messaging system 110 may use a wireless carrier 140.

Returning to 315, if a session does not exist for the user device identification, messaging system 110 may select an enterprise number from the enterprise pool at 330. If a session does not exist, messaging system 110 may not have delivered a message to the particular user device 150. At 330, messaging system 110 may then use any enterprise number from the pool of enterprise numbers. In an embodiment, messaging system 110 may follow a sequence from a list or table to select the next available enterprise number.

At 335, messaging system 110 may determine whether the enterprise number is associated with a second content provider. This determination may be made to avoid generating a conflicting scenario where two enterprises are using the same enterprise number to communicate with the same user device 150A. Although the enterprise number may be in use to communicate with a different user device 150B, messaging system may still use that enterprise number to communicate with user device 150A. An embodiment of this configuration was discussed with reference to FIG. 1B.

At 335, messaging system 110 may determine whether the enterprise number that is currently in use by the active session is associated with a second content provider. Messaging system 110 may check the stored record to make this determination.

At 340, messaging system may determine that the current enterprise number is not in use by a second content provider. In this scenario, at 345, messaging system 110 may optionally record the association of the enterprise number to the content provider 120 and the provided user device identification. In this manner, messaging system 110 may designate that an active session exists. In future iterations where enterprises seek to deliver messages, messaging system 110 may consult these records to avoid conflicting assignments of enterprise numbers. Using this configuration, messaging system 110 may provide shared enterprise numbers for enterprise use as well as avoid the requirement for end users to supply keywords in reply messages.

After determining that a particular enterprise number is not associated with a second content provider, messaging system 110 may send the message using the selected enterprise number at 325. Messaging system 110 may then optionally evaluate the number of active sessions relative to the size of the enterprise number pool at 350.

At 350, messaging system 110 may determine the number of active sessions and/or the number of enterprise numbers in the enterprise number pool. Messaging system 110 may determine whether the number of active sessions exceeds a threshold. In an embodiment, messaging system 110 may determine a ratio of these numbers and/or may compare the number of active sessions directly to a threshold. Messaging system 110 may use a predetermined threshold to determine at 355 whether more enterprise numbers are needed for the enterprise number pool. For example, messaging system 110 may compare the ratio of active sessions to the quantity of enterprise numbers of the enterprise number pool to a predetermined ratio threshold. If the ratio falls below the ratio threshold, messaging system 110 may determine that the size of the enterprise number pool is sufficient at 355 and end the process at 360. In an embodiment, ending the process at 360 may reinitiate method 300 at 305.

If the ratio exceeds the ratio threshold, messaging system 110 may determine that the size of the enterprise number pool is insufficient. This scenario may indicate that almost all of then enterprise numbers may be in use. To ensure that enterprise numbers are available, at 365, messaging system 110 may create a warning that more enterprise numbers are needed the enterprise number pool. This warning may be a message delivered to an administrator and/or a user. The warning may include instructions for supply additional enterprise numbers.

Returning to 335, messaging system 110 may determine that a selected enterprise number is associated with a second provider. This scenario may indicate that the enterprise number is unavailable and/or that using the enterprise number may generate a conflict. At 340, if the current enterprise number is being used by a second content provider that differs from the content provider providing the message, at 340, messaging system 110 may select another enterprise number at 370. Messaging system 110 may select another enterprise number from the enterprise number pool to avoid a conflict whether two different enterprises are using the same enterprise number to communicate with the same user device 150. Selecting another enterprise number at 370 may form a loop at 375.

At 375, messaging system 110 may continue to check to determine whether selected enterprise numbers are in use by other enterprises or content providers 120. This looping may occur if messaging system 110 uses a list or sequence of enterprise numbers and messaging system 110 steps through the list to determine the enterprise numbers. This list configuration may be useful when attempting to reduce the size of the pool of enterprise numbers and/or to avoid using excess numbers of enterprise numbers that may be unused. In an embodiment, messaging system 110 may maintain statuses of enterprise numbers and may avoid stepping through a list and completing a loop. For example, messaging system 110 may use status metadata to select another enterprise number that is unused to communicate with the user device 150.

At 375, messaging system 110 may check to determine whether another enterprise number was selected at 370. If an enterprise number was selected, messaging system 110 may recognize that the pool included an available number. In this case, messaging system 110 may execute 335 to determine whether the selected enterprise number is associated with a second content provider. If the enterprise number is not in use by a second content provider, messaging system 110 may execute 345, 325, and/or 350. If the enterprise number is in use, messaging system 110 may continue to loop until finding a number that is not in use by a second content provider.

At 375, messaging system 110 may determine that no additional numbers are available in the enterprise number pool. In this case, messaging system 110 may not have been able to select an enterprise number at 370. If no additional numbers are available, messaging system 110 may execute 365 and create a warning that more enterprise numbers are needed for the enterprise number pool.

Figure 4:
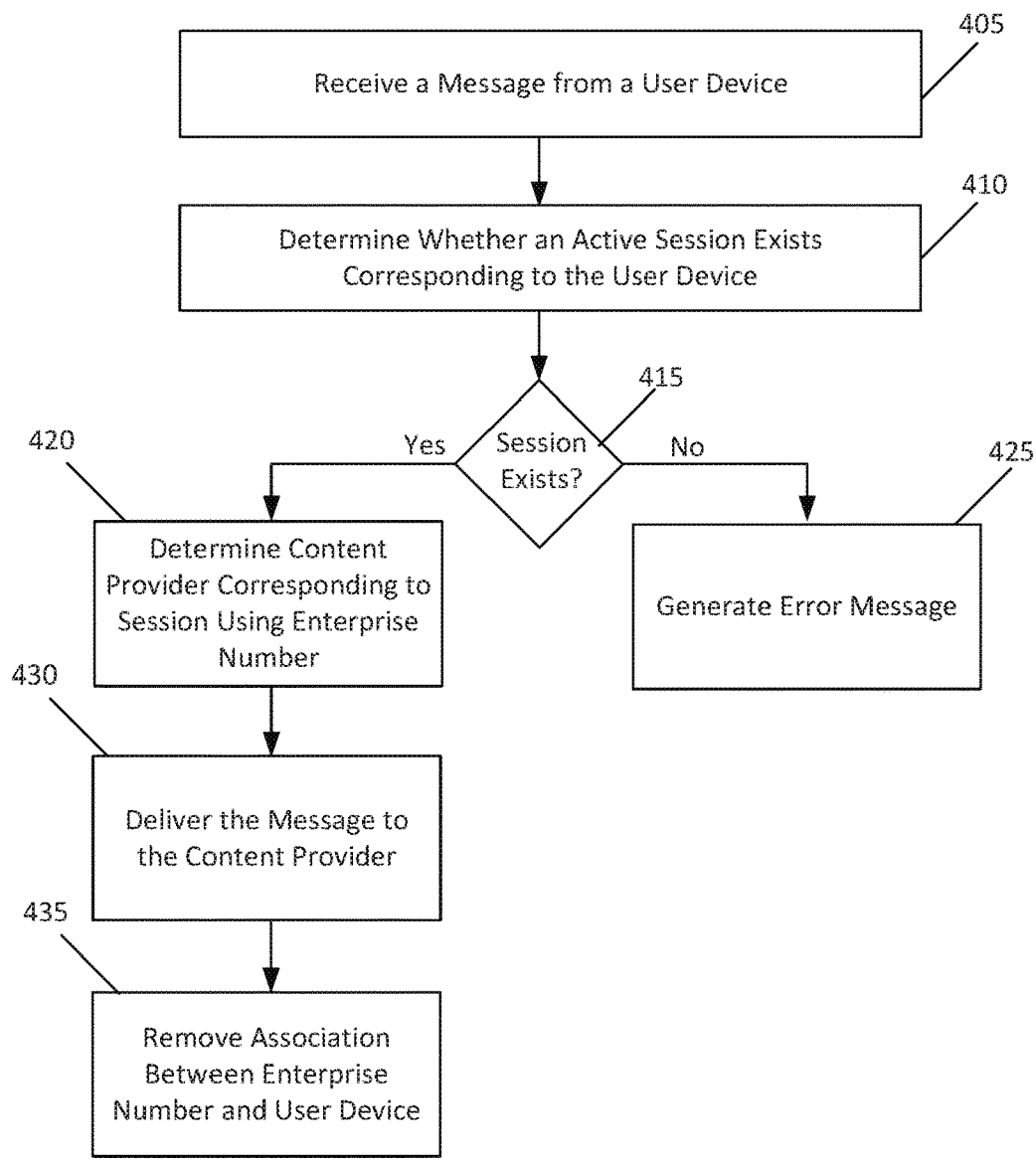
FIG. 4 depicts a flowchart illustrating a method for routing a message received via an enterprise number, according to some embodiments.

FIG. 4 depicts a flowchart illustrating a method 400 for routing a message received via an enterprise number, according to some embodiments. Method 400 shall be described with reference to FIG. 1A; however, method 400 is not limited to that example embodiment.

Messaging system 110 may utilize method 400 to deliver a reply message received from a user device 150 via an enterprise number. The foregoing description will describe an embodiment of the execution of method 400 with respect to messaging system 110. While method 400 is described with reference to messaging system 110, method 400 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4, as will be understood by a person of ordinary skill in the art.

At 405, messaging system 110 may receive a message from a user device 150. For example, messaging system 110 may receive the message as a reply message to an initial message sent by messaging system 110 on behalf of an enterprise. When receiving the message from the user device, messaging system 110 may receive a unique identification corresponding to the user device. For example, messaging system 110 may receive the telephone number associated with the user device. In an embodiment, messaging system 110 may also note the enterprise number that the user device 150 used when sending the message.

At 410, messaging system 110 may determine whether an active session exists corresponding to the user device 150. Messaging system 110 may check internal memory to determine whether messaging system 110 has previously sent a message and to determine whether the user device 150 is replying to the message. Further, the check may be for an active session and one that has not timed-out or that has been deallocated by messaging system 110. In the case of a time-out or deallocation, messaging system 110 may not be tracking the enterprise to user device 150 pairing and may not be able to facilitate a reply message.

At 415, if the session does not exist based on a search of stored records, messaging system 110 may generate an error message at 425. This error message may be returned to the user device 150 and may indicate that the period for replying has elapsed. In an embodiment, the error message may include directions for contacting an administrator for assistance if the user would like to continue to send the reply. Due to the shared nature of the enterprise numbers, an administrator and/or messaging system 110 may be able to correlate the desired reply message to the correct enterprise based on, for example, timestamps.

Returning to 415, if a session exists, messaging system 110 may determine the content provider 120 corresponding to the session using the enterprise number at 420. In an embodiment, messaging system 110 may check session records to identify the content provider 120 and/or service provider 130 that sent the initial message. Based on the unique configuration pairing the enterprise with the user device 150 via the enterprise number as described with reference to FIG. 3, messaging system 110 may determine corresponding enterprise without requiring the user device 150 to supply a keyword.

At 430, messaging system 110 may deliver the message to the content provider 120 or service provider 130. An enterprise may have elected to receive the reply message via the programming interface used to send the message. In this manner, messaging system 110 may deliver the reply message to a client application used for accessing messaging system 110. In an embodiment, the enterprise may elect to receive the reply message in another context. For example, the enterprise may receive the reply message in an email or another type of notification. Messaging system 110 may use these forms and/or may deliver the message in a cloud computing environment.

At 435, messaging system 110 may remove the association between the enterprise number and the particular user device 150. This action may indicate a completion of the session. Messaging system 110 may deallocate the enterprise number so that another enterprise may use the same number to communicate with the same user device 150. This deallocation may aid in reducing the number of enterprise numbers used in the pool and may avoid unnecessarily growing the pool of enterprise numbers.

Using method 400, messaging system 110 may deliver reply messages to enterprises sending mass communications using, for example, method 300. Messaging system 110 is able to facilitate the distribution of mass messages as well as monitor and distinguish between replies. This configuration may allow messaging system 110 to reduce resource expenditure in maintaining a large number of enterprise numbers, maintain flexibility with different types of enterprise numbers, and reduce the burden for end users in including keywords in responses. Enterprises may use messaging system 110 in a cloud computing context utilize messaging system 110 as a communication platform as a service to reach a wide range of user devices 150.

Figure 5:
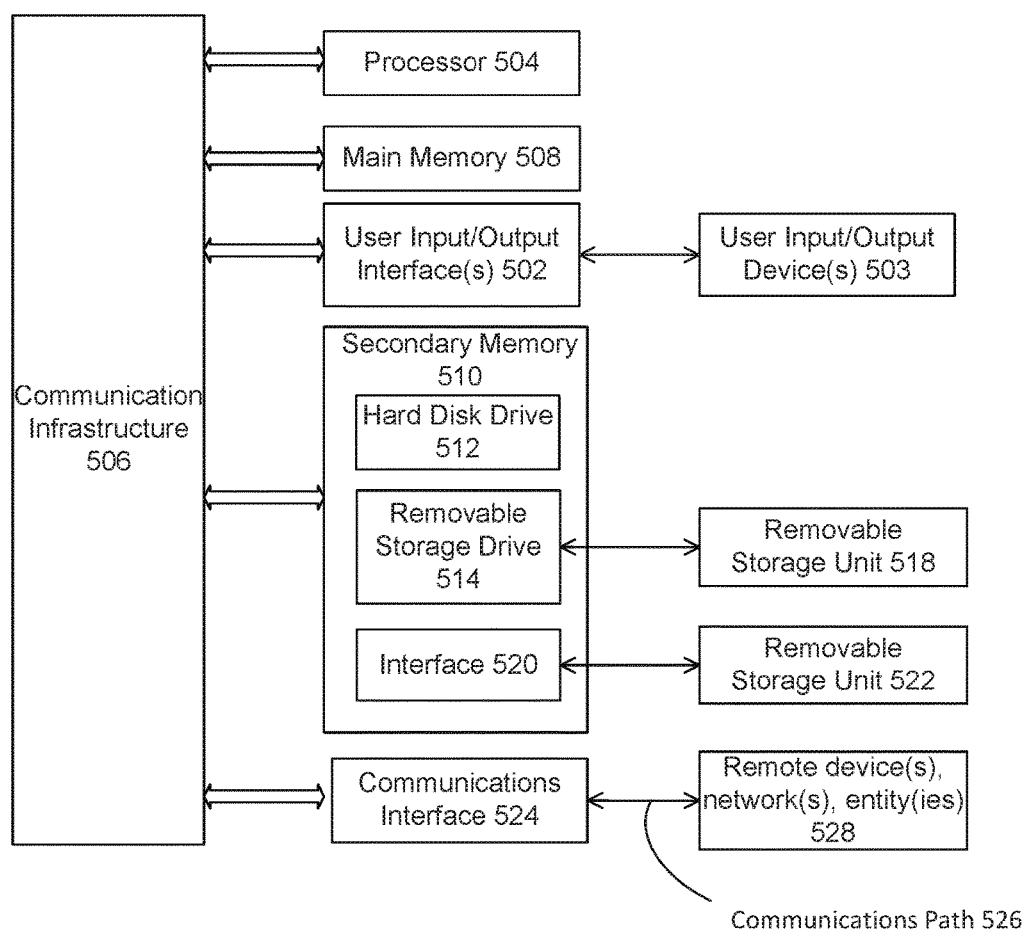
FIG. 5 depicts an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
receiving, from a first client application, a message and a user device identification indicating a target user device for delivery of the message;
determining that a session does not exist for the target user device using the user device identification;
selecting a shared enterprise number from a pool of shared enterprise numbers;
determining that the shared enterprise number is not associated with a second client application;
transmitting the message using the shared enterprise number to the target user device corresponding to the user device identification;
storing a data record correlating the shared enterprise number to the user device identification and the first client application;
receiving a reply message from the user device via the shared enterprise number;
retrieving the data record to identify the first client application using the user device identification and the shared enterprise number; and
transmitting the reply message to the first client application.

2. The computer-implemented method of claim 1, the receiving further comprising:
receiving the message and the user device identification from a cloud computing platform executing the first client application.

3. The computer-implemented method of claim 1, wherein the user device identification is a telephone number.

4. The computer-implemented method of claim 1, wherein the pool of shared enterprise numbers includes short codes and long codes.

5. The computer-implemented method of claim 1, further comprising:
converting the message from a cloud computing format to a mobile user device format.

6. The computer-implemented method of claim 1, further comprising:

receiving, from a second client application, a second message and second user device identification indicating a second target user device for delivery of the second message;

transmitting the second message using the shared enterprise number to the second target user device corresponding to the second user device identification; and updating the data record to correlate the shared enterprise number with the second user device identification and the second client application.

7. The computer-implemented method of claim 6, the updating further comprising:

updating the data record to indicate that the first client application and the second client application have simultaneous active sessions using the shared enterprise number.

8. A system, comprising:

a memory; and at least one processor coupled to the memory, the at least one processor configured to:

receive, from a first client application, a message and a user device identification indicating a target user device for delivery of the message;

determine that a session does not exist for the target user device using the user device identification;

select a shared enterprise number from a pool of shared enterprise numbers;

determining that the shared enterprise number is not associated with a second client application;

transmit the message using the shared enterprise number to the target user device corresponding to the user device identification;

store a data record correlating the shared enterprise number to the user device identification and the first client application;

receive a reply message from the user device via the shared enterprise number;

retrieve the data record to identify the first client application using the user device identification and the shared enterprise number; and transmit the reply message to the first client application.

9. The system of claim 8, wherein to receive the message, the at least one processor is further configured to:

receive the message and the user device identification from a cloud computing platform executing the first client application.

10. The system of claim 8, wherein the user device identification is a telephone number.

11. The system of claim 8, wherein the pool of shared enterprise numbers includes short codes and long codes.

12. The system of claim 8, wherein the at least one processor is further configured to:

convert the message from a cloud computing format to a mobile user device format.

13. The system of claim 8, wherein the at least one processor is further configured to:

receive, from a second client application, a second message and second user device identification indicating a second target user device for delivery of the second message;

transmit the second message using the shared enterprise number to the second target user device corresponding to the second user device identification; and update the data record to correlate the shared enterprise number with the second user device identification and the second client application.

14. The system of claim 13, wherein to update the data record, the at least one processor is further configured to:

update the data record to indicate that the first client application and the second client application have simultaneous active sessions using the shared enterprise number.

15. A non-transitory computer-readable device having instructions stored thereon that, when executed by at least one computing device, cause the at least one computing device to perform operations comprising:

receiving, from a first client application, a message and a user device identification indicating a target user device for delivery of the message;

determining that a session does not exist for the target user device using the user device identification;

selecting a shared enterprise number from a pool of shared enterprise numbers, wherein the second shared enterprise number is associated with a second session that does not correspond to the user device identification;

determining that the shared enterprise number is not associated with a second client application;

transmitting the message using the shared enterprise number to the target user device corresponding to the user device identification;

storing a data record correlating the shared enterprise number to the user device identification and the first client application;

receiving a reply message from the user device via the shared enterprise number;

retrieving the data record to identify the first client application using the user device identification and the shared enterprise number; and transmitting the reply message to the first client application.

16. The non-transitory computer-readable device of claim 15, the receiving further comprising:

receiving the message and the user device identification from a cloud computing platform executing the first client application.

17. The non-transitory computer-readable device of claim 15, wherein the user device identification is a telephone number.

18. The non-transitory computer-readable device of claim 15, wherein the pool of shared enterprise numbers includes short codes and long codes.

19. The non-transitory computer-readable device of claim 15, the operations further comprising:

converting the message from a cloud computing format to a mobile user device format.

20. The non-transitory computer-readable device of claim 15, the operations further comprising:

receiving, from a second client application, a second message and second user device identification indicating a second target user device for delivery of the second message;

transmitting the second message using the shared enterprise number to the second target user device corresponding to the second user device identification; and updating the data record to correlate the shared enterprise number with the second user device identification and the second client application and to indicate that the first client application and the second client application have simultaneous active sessions using the shared enterprise number.

* * * * *